United States Patent
Park et al.

(10) Patent No.: US 6,379,767 B1
(45) Date of Patent: Apr. 30, 2002

(54) OPTICAL RECORDING MEDIUM WITH MULTIPLE RECORDING LAYERS AND FABRICATING METHOD THEREOF

(75) Inventors: Kyung Chan Park, Seoul; Jin Yong Kim, Kyunggi-do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/299,879

(22) Filed: Apr. 27, 1999

(30) Foreign Application Priority Data

Apr. 28, 1998 (KR) .............................. 98-15226
May 30, 1998 (KR) .............................. 98-20019

(51) Int. Cl.$^7$ ................................. B32B 3/02
(52) U.S. Cl. .................... 428/64.1; 428/64.4; 428/64.5; 430/270.13
(58) Field of Search .............. 428/64.1, 64.2, 428/64.4, 64.5, 64.6, 913; 430/270.13, 495.1, 945; 369/275.1, 283, 288

(56) References Cited

U.S. PATENT DOCUMENTS 5,679,429 A * 10/1997 Hintz ......................... 428/64.1
5,766,717 A * 6/1998 Kaneko ..................... 428/64.1
5,817,389 A * 10/1998 Ono .......................... 428/64.1

FOREIGN PATENT DOCUMENTS

| JP | 02096926 | 4/1990 |
|---|---|---|
| JP | 06028712 | 2/1994 |
| JP | 06060425 | 3/1994 |
| JP | 09320107 | 12/1997 |
| KR | 96 19151 | 11/1994 |

* cited by examiner

Primary Examiner—Elizabeth Evans
(74) Attorney, Agent, or Firm—Birch, Stewart, Kolasch & Birch, LLP

(57) ABSTRACT

An optical recording medium with a number of recording layers that is adaptive for enhancing a light efficiency and for improving a responsibility of information and a recording capacity. In the optical recording medium, at least one of recording layers in the number of recording layers are formed of a material having a non-linear optical characteristic. The recording layer made from the non-linear optical characteristic material has a higher reflective coefficient as a light intensity becomes stronger, thereby improving a light efficiency when a recording layer far away from the light source is accessed. Also, the recording layer made from the non-linear optical characteristic allows an effective diameter of a light spot to be reduced, thereby enlarging a recording capacity of the optical recording medium.

8 Claims, 9 Drawing Sheets

OPTICAL RECORDING MEDIUM WITH MULTIPLE RECORDING LAYERS AND FABRICATING METHOD THEREOF

BACKGROUND OF THE INVENTION

1. Field of the Invention

This invention relates to an optical recording medium in which an information is optically recorded, and more particularly to a multi-layer optical recording medium having a number of recording layers.

2. Description of the Prior Art

Generally, an optical recording medium has been fabricated in a disc type having a fast random access ability. The disc-type optical recording medium is classified into a read-only type and a recordable type. Also, the recordable disc is subdivided into a write-once-read-only(WROM) type which is recordable once and a rewritable type which is recordable repeatedly. The read-only type disc includes a compact disc-read only memory(CD-ROM) and a digital versatile disc-read only memory(DVD-ROM), etc. Furthermore, the WORM type disc includes a recordable compact disc(CD-R) and a recordable digital versatile disc (DVD-R), etc. and the rewritable disc includes a rewritable compact disc(CD-RW), a rewritable digital versatile disc (DVD-RW or DVD-RAM) and a magneto-optical disc MOD, etc.

Figure 1:
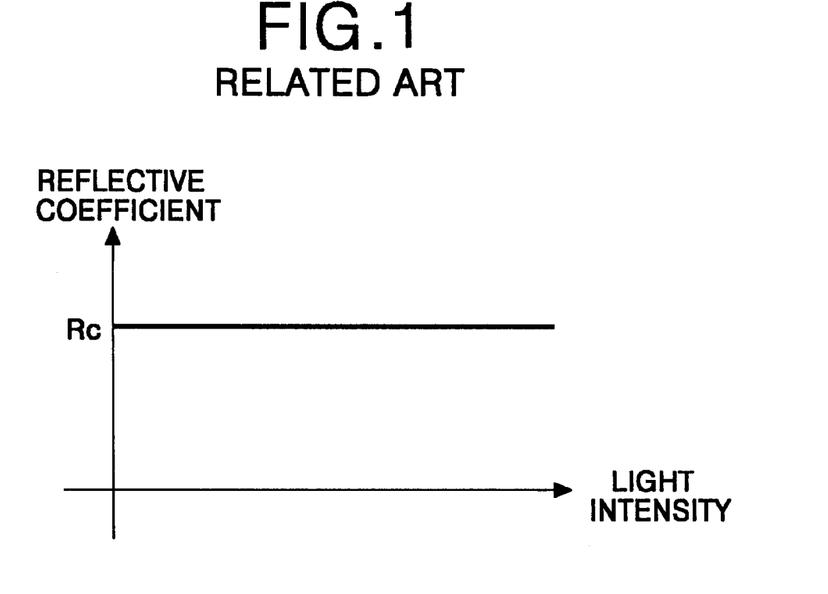
FIG. 1 is a graph for explaining a light reflection characteristic of recording layers included in a multi-layer optical recording medium in the related art.
Figure 2:
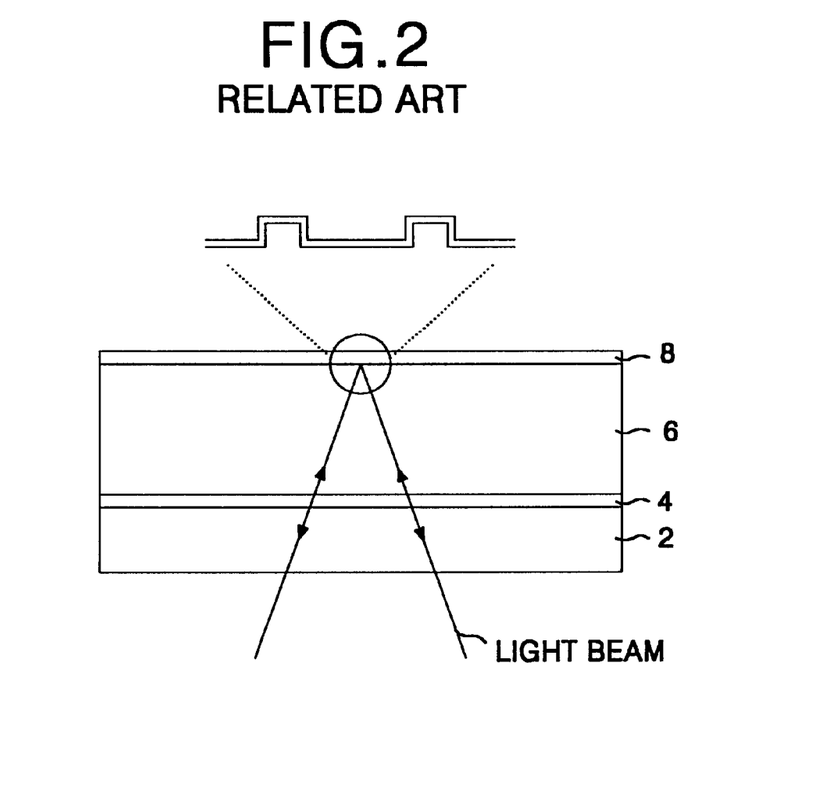
FIG. 2 is a sectional view of a light recording medium having two recording layers according to the related art.

Such an optical recording medium requires a large recording capacity enough to record a large information such as a moving picture. In order to satisfy the requirement for a large recording capacity, there has been developed a double-face optical recording medium wherein a track pitch is narrow and a recording face exists in each of the upper and lower surfaces thereof. For example, U.S. Pat. No. 4,450, 553 discloses a multi-layer optical recording medium having at least two recording layers alternately disposed with light transmission layers used as a substrate. The multi-layer optical recording medium is noticed in that it can assure a larger recording capacity than a double-face optical recording medium. According to the U.S. Patent, the recording layer used for the multi-layer optical recording medium has a light reflection characteristic as well as a light transmission characteristic. This is caused by a fact that, when a certain recording layer is accessed, the upper recording layers thereof must transmit a light while the certain recording layer must reflect a received light. Accordingly, the recording layers of the multi-layer optical recording medium is formed of a semi-permeable material having the two optical characteristics. The semi-permeable material has an intrinsic light reflection coefficient Rc expressed as a certain constant value to reflect a constant ratio of incident light amount irrespective of an intensity of the incident light as shown in FIG. 1. The intrinsic light reflection coefficient Rc of the semi-permeable material becomes different depending upon a type of semi-permeable material. Due to the recording layers of the semi-permeable material, a light loss is generated at the multi-layer optical recording medium. For instance, when a second recording layer 8 included in a two-layer optical disc as shown in FIG. 2 is accessed, that is, when a light spot is formed on the second recording layer 8, a light incident to the second recording layer 8, via a first light transmission layer 2, a first recording layer 4 and a second light transmission layer 6, from a light source(not shown) is lost by an amount corresponding to a reflection coefficient of the first recording layer 4. Also, a reflective light reflected by the second recording layer 8 is more reduced by an amount corresponding to a light transmissivity of the second recording layer 8. Furthermore, a reflective light passing through the second light transmission layer 6, the first recording layer 4 and the first light transmission layer 2 from the second recording layer 8 is again reduced by an amount corresponding to a light reflection coefficient of the first recording layer 1. Herein, it is assumed that an absorption coefficient of each of the first and second recording layers 4 and 8 is "0", a light reflection coefficient R1 of the first recording layer 4 is 0.3, that is, a light transmissivity (1−R1) of the first recording layer 4 is 0.7, and a light reflection coefficient R2 of the second recording layer 8 is 0.7. In this case, a light amount reflected by the second recording layer 8 and emitting from the first light transmission layer 2 becomes equal to "0.343=(1−R1)×R2×(1−R1)= 0.7×0.7×0.7" times of the light amount incident to the first light transmission layer 2. On the other hand, when the first recording layer 4 of the two-layer optical disc in FIG. 2 is accessed, a reflective light amount emitting from the first light transmission layer 2 becomes equal to 0.3 times of the light amount incident to the first light transmission layer 2. In other words, when the first recording layer 4 is accessed, a light loss amount becomes 70% of the incident light amount.

In order to increase a reflective light amount emitted from the first light transmission layer 2 when the first recording layer 4 is accessed, the reflection coefficient R1 of the first recording layer 4 can be heightened. For instance, if the reflection coefficient of the first recording layer 4 has been set to 40%, then a reflective light amount emitted from the first light transmission layer 2 when the first recording layer 4 is accessed, increases into 40% of the light amount incident to the first light transmission layer 2. But, a reflective light amount emitted from the first light transmission layer 2 when the second recording layer 8 is accessed, decreases dramatically due to a low light transmissivity (1−R1) of the first recording layer 4. In other words, a reflective light amount emitted from the first light transmission layer 2 when the second recording layer 8 is accessed, becomes equal to "0.252=(1−R1)×0.7×(1−R1)=0.6×0.7× 0.6" times of a light amount incident to the first light transmission layer 2. As described above, a reflective light amount when the second recording layer 8 is accessed, is dramatically reduced in comparison to a reflective light amount when the first recording layer 4 is accessed. Accordingly, a signal detected from the second recording layer 8 also has a dramatically lower voltage level than a signal detected from the first recording layer 4. In other words, the signal detected from the first recording layer 4 can have a reproducible voltage level, but the signal detected from the second recording layer 8 fails to obtain the reproducible voltage level. As a result, a data recorded on the second recording layer 8 can not be read out by an optical pickup. In view of this, it is necessary to provide a multi-layer optical recording medium with a high light efficiency so that all the multiple recording layers can be accessed.

SUMMARY OF THE INVENTION

Accordingly, it is an object of the present invention to provide an optical recording medium with a number of recording layers that is adaptive for enhancing a light efficiency, and a method of fabricating the same.

Further object of the present invention is to provide an optical recording medium with a number of recording layers that is adaptive for improving a responsibility in the information reproduction, and a method of fabricating the same.

Still further object of the present invention is to provide an optical recording medium that is adaptive for increasing a recording capacity, and a method of fabricating the same.

In order to achieve these and other objects of the invention, in an optical recording medium with a number of recording layers according to one aspect of the present invention, at least one of the number of recording layers is made from a non-linear material having a non-linear optical characteristic.

A method of fabricating an optical recording medium with a number of recording layers according to another aspect of the present invention includes the steps of providing a number of substrates; forming a recording layer on each of the number of substrates in such a manner that a material with a non-linear optical characteristic having a different reflective coefficient depending on a light intensity is formed on at least one of the number of substrates; and bonding the same in such a manner that the number of substrates are disposed.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 3:
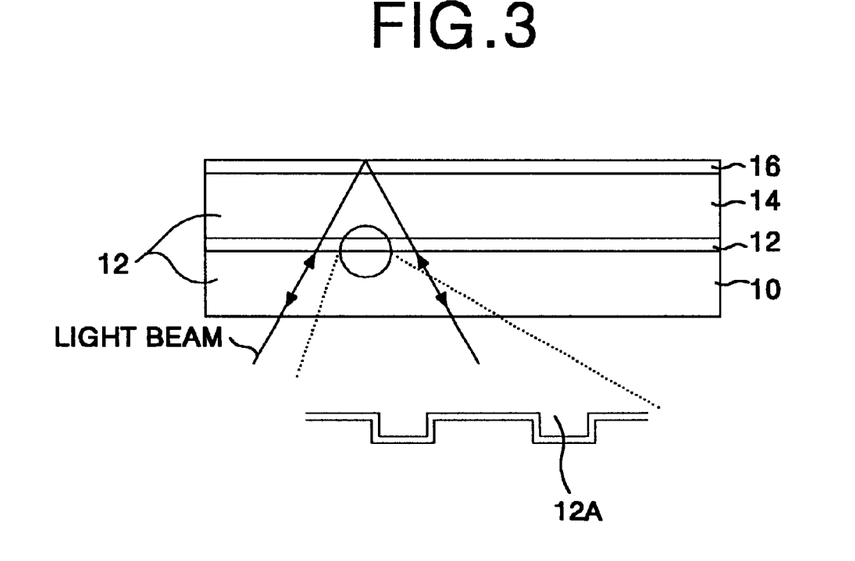
FIG. 3 is a sectional view of a light recording medium having two recording layers according to an embodiment of the present invention.

Referring to FIG. 3, there is shown an optical recording medium with two recording layers according to an embodiment of the present invention. The optical recording medium includes a first recording layer 12 positioned between first and second light transmission layers 10 and 14. The first recording layer 12 is provided with guide grooves 12A, and recording pits or recording marks(not shown). Such a first recording layer 12 is formed of a non-linear reflective material having a reflection coefficient increasing non-linearly as a light intensity becomes strong. The non-linear reflective material includes a-Si, InSb, ZnTe, ZnSe, CdSSe, GaAs and GaSb, etc. When the first recording layer 12 is formed of such a non-linear reflective material, it have a reflection coefficient R1 to be changed in accordance with $|\{(n-n_s)/(n+n_s)\}|^2$. Herein, "$n_s$" represents a refractive index of the light transmission layers 10 and 14, and "n" does a refractive index of the first recording layer 12 made from a non-linear reflective material. A refractive index n of the first recording layer 12 made from a non-linear reflective material is given by the following formula:

$$n = n_0 + n_2 I \qquad (1)$$

wherein "$n_0$" represent a linear refractive index, "$n_2$" does a non-linear refractive index, and "I" does an intensity of incident light (W/cm$^2$). The non-linear refractive index "$n_2$" is given by the following formula:

$$n_2 = \frac{12\pi^2}{n_0^2 C} \chi^{(3)} \times 10^7 \text{cm}^2/\text{W} \qquad (2)$$

Figure 5:
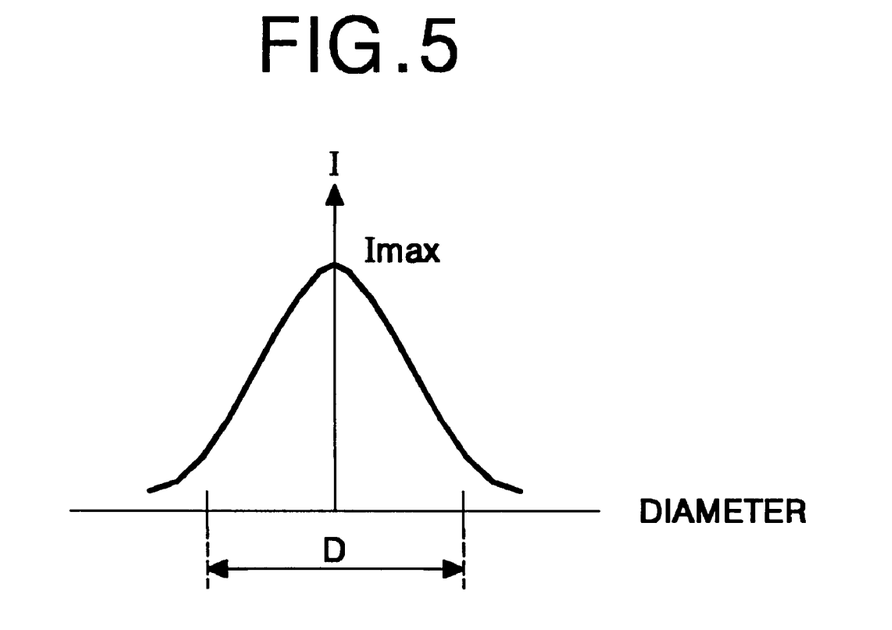
FIG. 5 is a graph for explaining a change in a light intensity according to a diameter of a light spot irradiated onto an optical recording medium.
Figure 6:
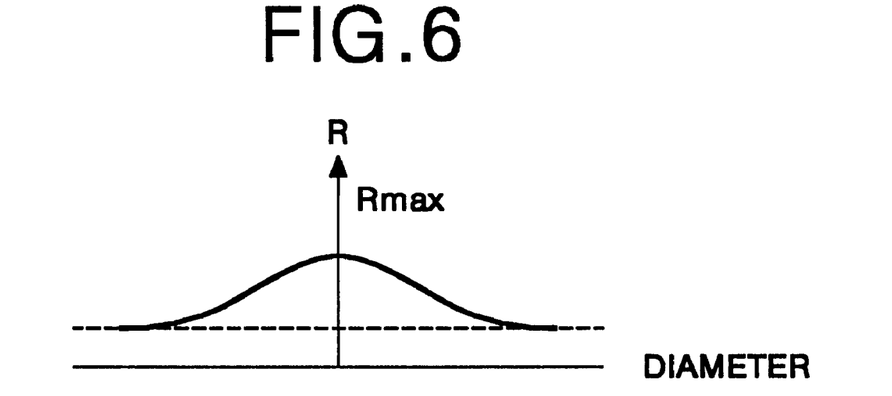
FIG. 6 is a graph for explaining a change in a reflection coefficient of the first recording layer according to a diameter of the light spot shown in FIG. 3.
Figure 7:
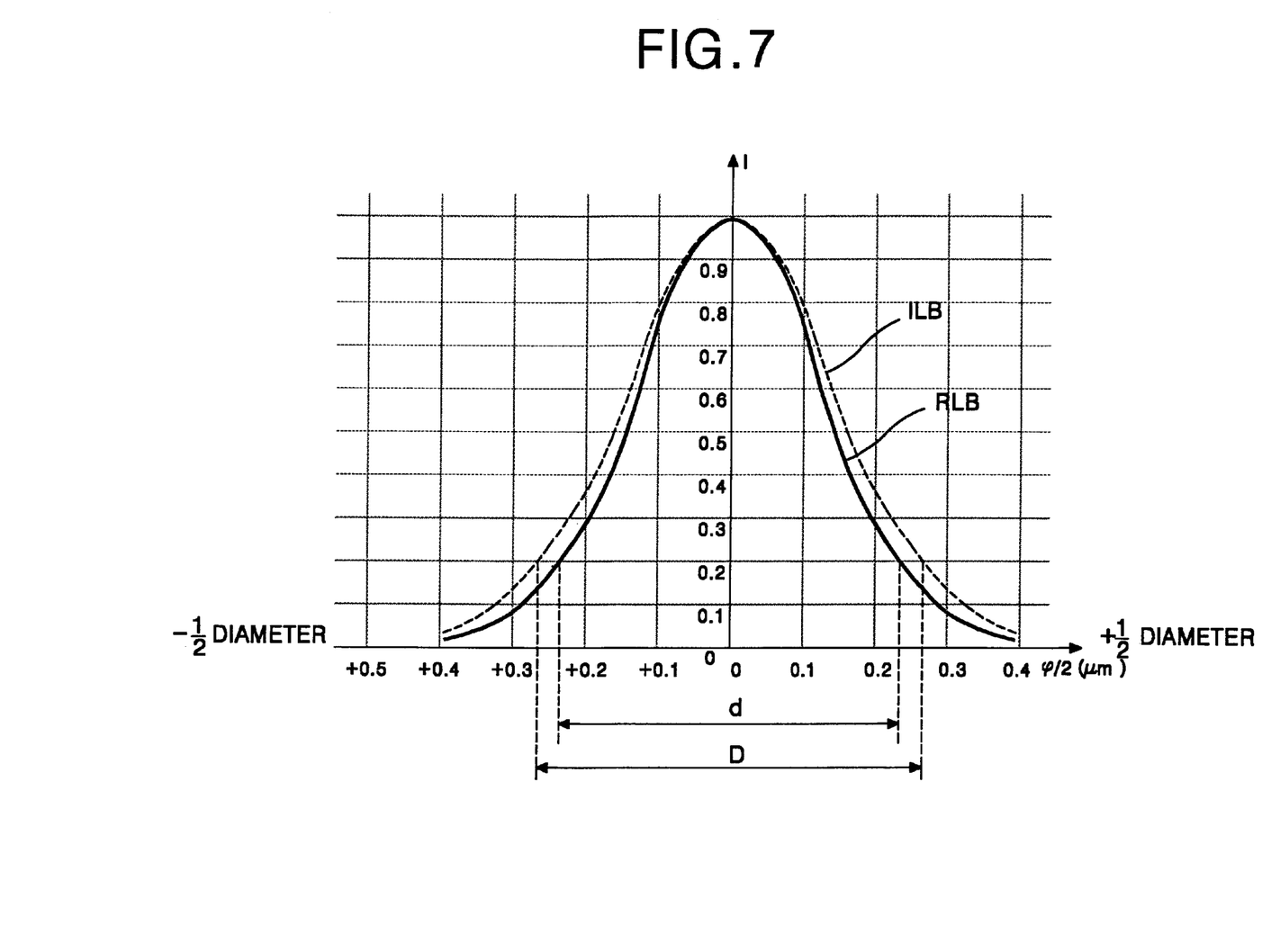
FIG. 7 is a graph showing the relationship of an incident light spot at the first recording layer shown in FIG. 3 to a reflective light spot thereat.

Wherein, "$\chi$" represents a non-linear susceptibility(esu), and C does a speed of light($3\times10^{10}$ cm/sec). Further, "$\chi^{(2)}$" and "$\chi^{(3)}$" represent second-order and third-order susceptibilities, respectively. According to the formula (2), the linear refractive index $n_2$ is determined by the third-order susceptibility $\chi^{(3)}$. Accordingly, a non-linear reflection characteristic of the first recording layer 12 is controlled as the third-order susceptibility $\chi^{(3)}$ is varied. Also, the third-order susceptibility $\chi^{(3)}$ is varied by doping a non-linear reflective material making the first recording layer 12 with an impurity. For example, if a-Si has a linear refractive index no and a third-order non-linear susceptibility $\chi^{(3)}$ of $10^{-3}$ esu, then non-linear refractive index $n_2$ becomes $3.23\times10^{-6}$ cm$^2$/W. When a light with a light intensity I of "0" or "$2\times10^5$ W/cm$^2$" is irradiated onto the first recording layer 12 formed of such a a-Si, a light amount equal to 16% or 23% of the incident light (7% in a difference of reflection coefficient $\Delta R$) is reflected by the first recording layer 12. In other words, the first recording layer 12 formed of a-Si has a non-linear reflection characteristic in that a reflection coefficient R1 rises non-linearly as an intensity I of the incident light increases. Such a non-linear reflection characteristic of the first recording layer 12 can be controlled by doping a-Si with an impurity such as H or N, etc. The first recording layer 12 made from a non-linear reflective material as described above allows the recording capacity of an optical recording medium to be increased by reducing a recording pit (or recording mark) expressing an information. This results from the size of an effective light beam being reduced due to the non-linear reflection characteristic of the first recording layer 12. More specifically, the intensity of light beam usually has a maximum value Imax at the center of a light spot and has a gradually lower value as it goes toward a circumference of the light spot' as shown in FIG. 5. Also, a light spot irradiated onto the first recording layer 12 has an effective diameter D to access an information on the first recording layer 12. When a light spot with an intensity as seen from FIG. 5 is irradiated onto the first recording layer 12, the reflection characteristic of the first recording layer 12 appears as shown in FIG. 6. In FIG. 6, a reflection coefficient R1 of the first recording layer 12 has a maximum value Rmax at the center of a light spot, and has a gradually lower value as it goes the circumference of the light spot. Accordingly, the circumference portion of the light spot irradiated onto the first recording layer 12 is almost not reflected. As a result, a reflective light beam RLB reflected by the first recording layer 12 has a smaller effective diameter d than an effective diameter D of the incident light beam ILB as shown in FIG. 7. Referring to FIG. 7, a spot of the reflective light beam RLB reflected from the first recording layer 12 has an effective diameter d equal to 93% of a spot ILB of the incident light beam ILB. As the effective diameter d of the reflective light beam ILB is decreased, the first recording layer 12 is accessed accurately and the recording pit (or recording mark) on the first recording layer 12 is reduced. Furthermore, a recording capacity of the light recording medium having the first recording layer 12 made from a non-linear reflective material is enlarged. Meanwhile, the first and second light transmission layers 10 and 14 is usually formed of a glass or a polycarbonate, etc. used as the substrate. The second recording layer 16 is defined on the second light transmission layer 14. The second recording layer 16 is formed of a metal material, such as aluminum, etc., to reflect all the incident lights.

Figure 4:
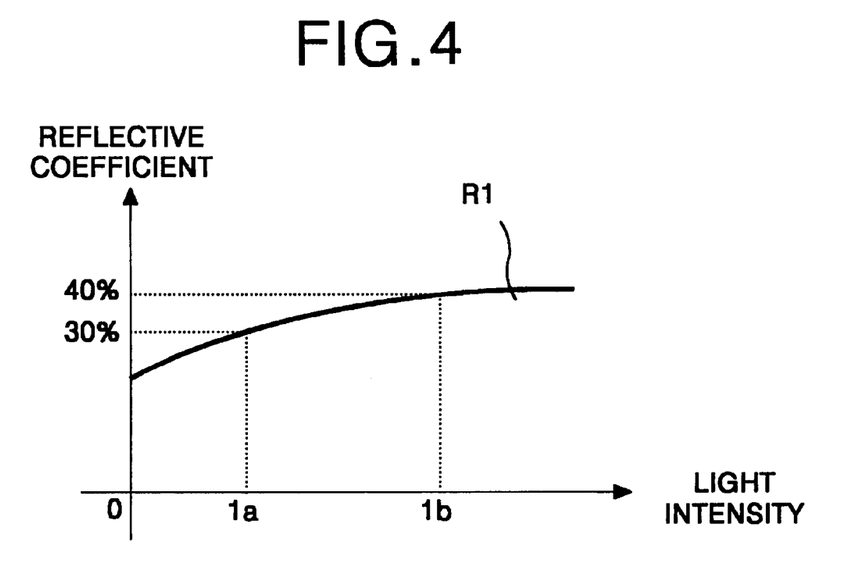
FIG. 4 is a graph for explaining a reflection characteristic of the first recording layer shown in FIG. 3.

An optical characteristic of the light recording medium in FIG. 3 will be described below. When the first recording layer 12 is accessed, a light beam irradiated onto the first recording layer 12 has a relatively high intensity because a light spot is formed on the first recording layer 12. In this case, if the intensity of a light irradiated onto the first recording layer 12 is "$1b$", then a reflection coefficient R1 of the first recording layer 12 becomes 0.4 as shown in FIG. 4. Accordingly, when the first recording layer 12 is accessed, a light amount reflected by the optical recording medium becomes 40% of the incident light amount. Otherwise, when the second recording layer 12 is accessed, a light irradiated onto the first recording layer 12 has a relatively low intensity value because a light spot is formed on the second recording layer 16. In this case, if the intensity of a light irradiated onto the first recording layer 12 is "$1a$", then the first recording layer 12 reflects 30% of the incident light while transmitting 70% thereof toward the second recording layer 16. A light beam transmitting the first recording layer 12 is reflected by the second recording layer 16 and thereafter is again weakened when it passes the first recording layer 12. Herein, a reflection coefficient R2 of the second recording layer 16 is 0.7, then a reflection coefficient of the optical recording medium when the second recording layer 16 is accessed becomes "$0.343=(1-R1) \times R2 \times (1-R1)=0.7 \times 0.7 \times 0.7$". Accordingly, when the second recording layer 16 is accessed, the optical recording medium reflects 34.3% of the incident light amount. As described above, a reflection coefficient of the first recording layer 12 increases non-linearly in accordance with the intensity of a light beam, so that an optical recording medium according to an embodiment of the present invention has a high light reflection coefficient even when the second recording layer 16 is accessed. Accordingly, an optical recording medium according to an embodiment of the present invention allows an information recorded on a recording layer away from a light source to be accurately reproduced.

The second recording layer 16 can be formed in a dual layer structure including a full-reflective recording layer made from a full-reflective recording material and a non-linear reflective recording layer made from a non-linear reflective material. When such a structure of second recording layer 16 is accessed, its refection coefficient becomes increased into more than 0.35. This results from a refractive index of the non-linear reflective recording layer rising as a light intensity increase. In other words, it is caused by a fact that a reflection coefficient of the full-reflective recording layer is added to that of the non-linear reflective recording layer to thereby raise a reflection coefficient of the second recording layer 16.

Otherwise, the second recording layer 16 may be formed of only a non-linear reflective material. The second recording layer 16 formed of a non-linear material allows an effective diameter of a light spot to be decreased to thereby reduce a size of the recording pit. As a result, a recording capacity of the second recording layer 16 is enlarged.

An optical recording medium of FIG. 3 is formed of the same material as the first recording layer 12 at the lower surface of the first light transmission layer 10, and may be further provided with a number of non-linear reflective recording layers arranged alternately with the light transmission layer. Because a reflection coefficient of the non-linear reflective recording layer varies in accordance with a light intensity even when the number of non-linear reflective recording layers exist, a light efficiency when the second recording layer 16 is accessed is increased. As a result, the second recording layer 16 is accurately accessed.

Furthermore, the first recording layer 12 can be formed in a dual layer structure including a semi-transmission recording layer made from a semi-permeable material and the above-mentioned non-linear reflective recording layer. A number of recording layers identical to the first recording layer with such a dual layer structure may be installed at the lower portion of the first light transmission layer 10 alternately with the light transmission layers identical to the first light transmission layer 10.

Figure 8:
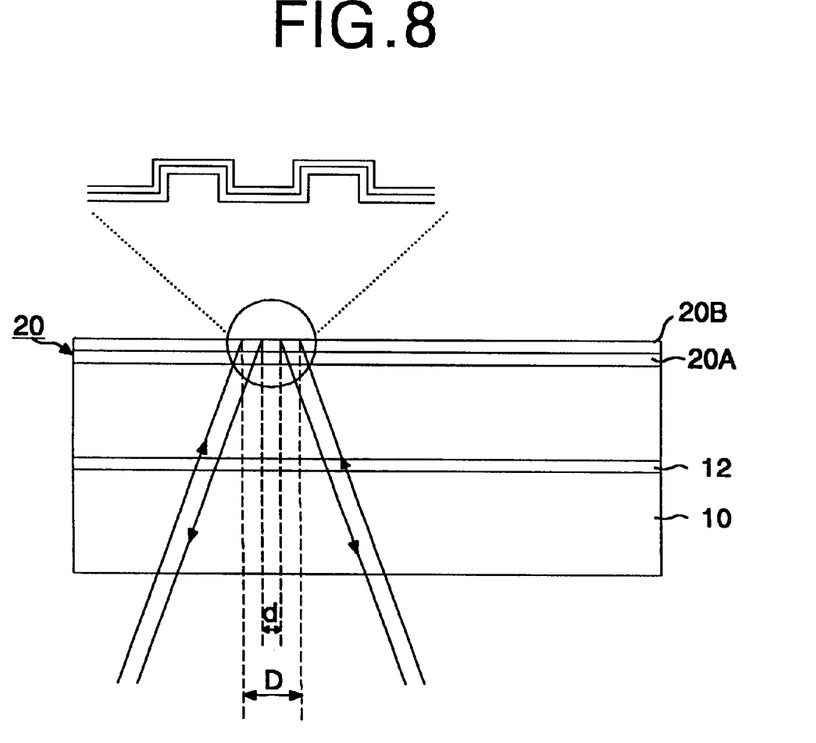
FIG. 8 is a sectional view of a light recording medium having two recording layers according to another embodiment of the present invention.

Referring now to FIG. 8, there is shown an optical recording medium with two recording layers according to another embodiment of the present invention. The optical recording medium includes a first recording layer 12 positioned between first and second light transmission layers 10 and 14. The first recording layer 12 formed of a non-linear reflective material is accurately accessed by reducing an effective diameter d of a light beam as shown in FIG. 3. Accordingly, a recording pit (or a recording mark) on the first recording layer 12 becomes small and, at the same time, a recording capacity of the first recording layer 12 becomes large. The first and second light transmission layers 10 and 14 is usually formed of a glass or a polycarbonate, etc. used as the substrate.

Figure 9:
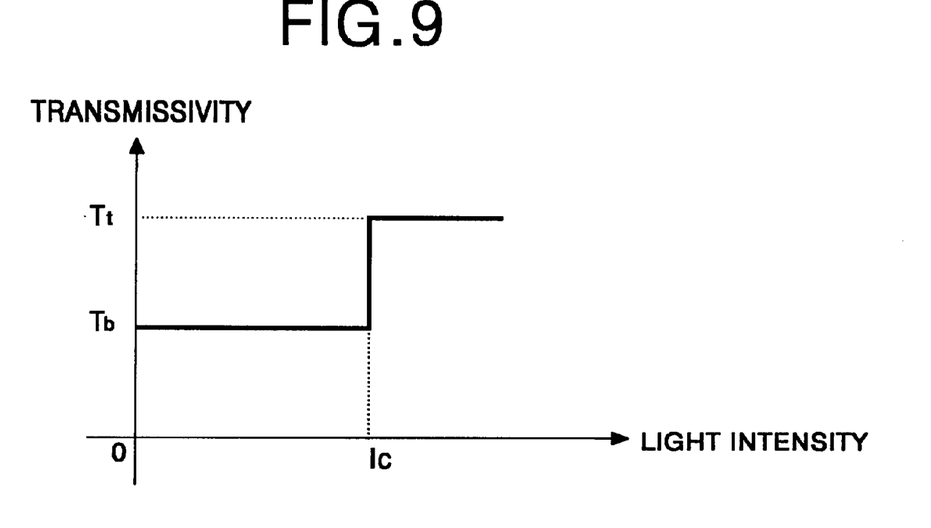
FIG. 9 is a graph showing a transmission characteristic of the non-linear transmission material film shown in FIG. 8 with respect to a light intensity.
Figure 10:
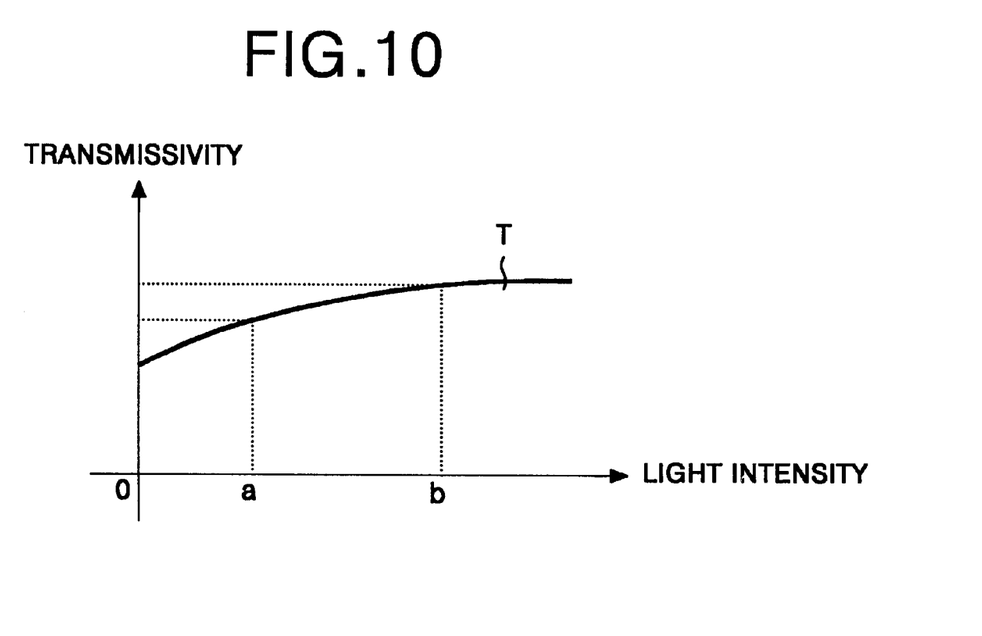
FIG. 10 is a graph showing a transmission characteristic of the conventional non-linear transmission material.
Figure 11:
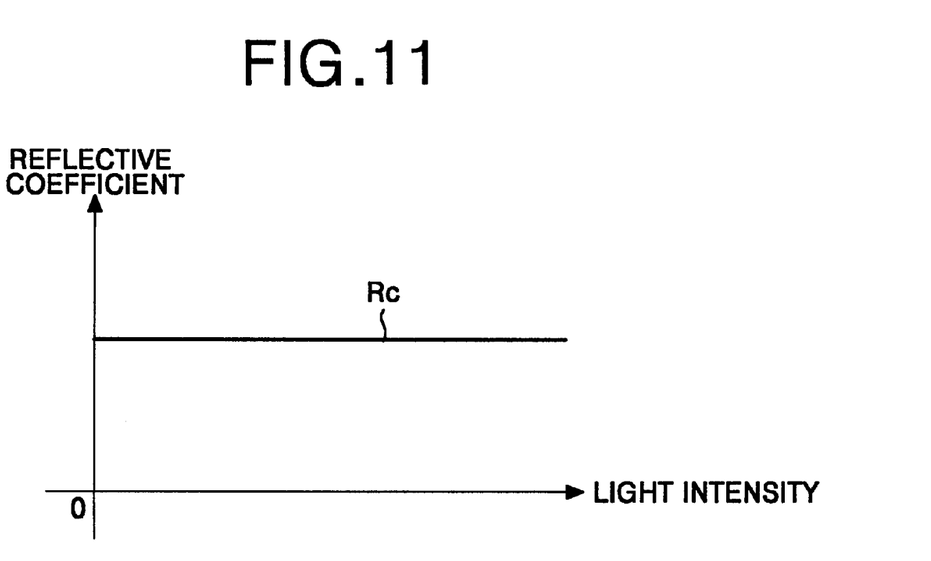
FIG. 11 is a graph showing a reflection characteristic of the full-reflective recording film shown in FIG. 8.
Figure 12:
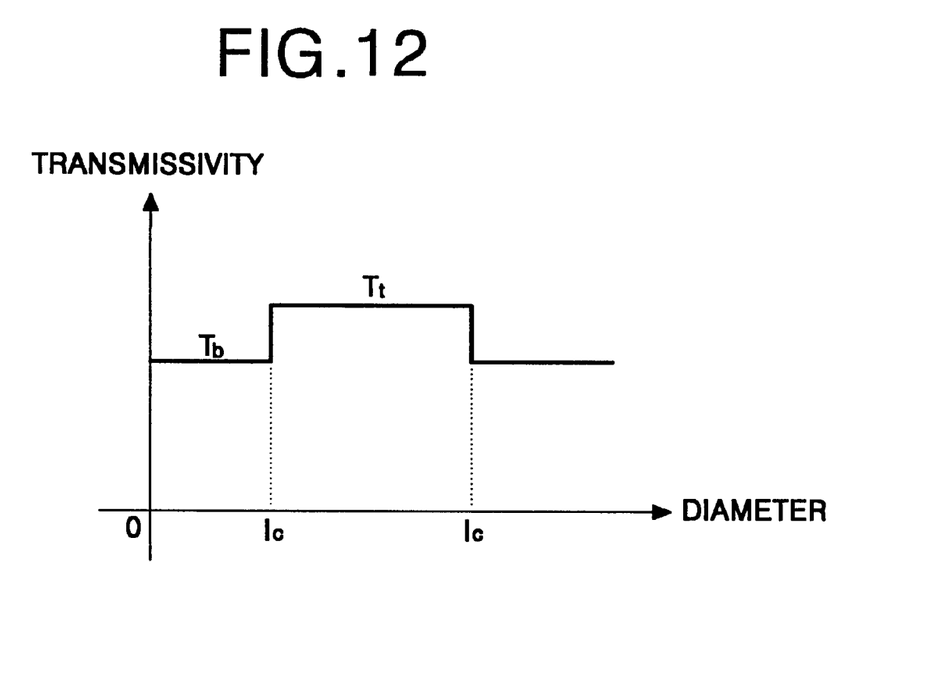
FIG. 12 is a graph showing a transmission characteristic of the non-linear transmission material film shown in FIG. 8 with respect to a diameter of a light spot.
Figure 13:
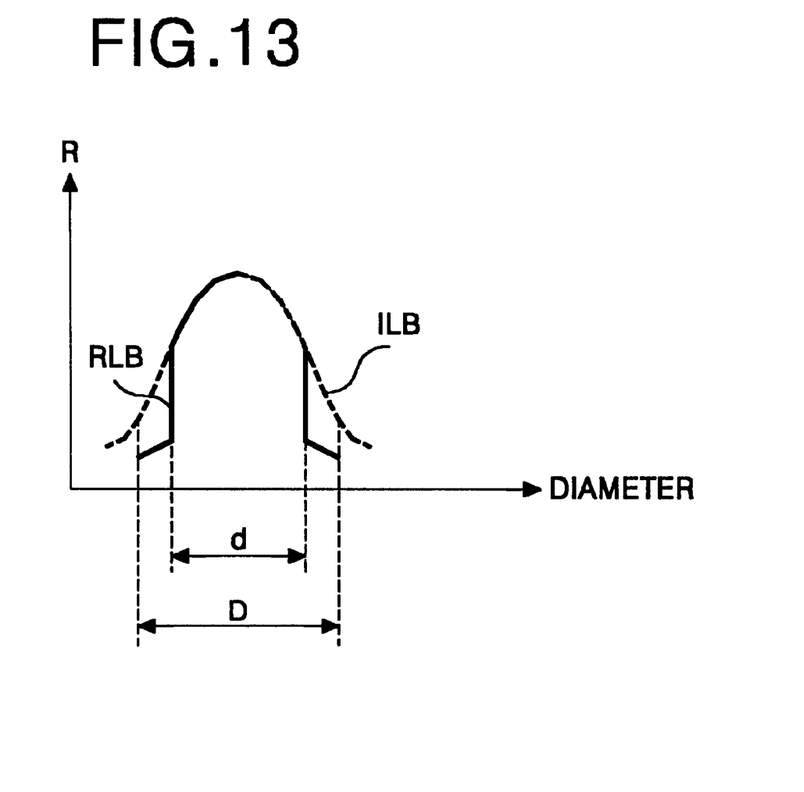
FIG. 13 is a graph for explaining the relationship of an incident light spot at the second recording layer shown in FIG. 8 to a reflective light spot thereat.

Further, a second recording layer 20 is disposed on the second light transmission layer 14. The second recording layer 16 includes a non-linear transmission recording film 20A made from a non-linear material with a non-linear transmission characteristic, and a full-reflective recording film 20B made from a metal material such as aluminum, etc. As shown in FIG. 9, the non-linear transmission recording film 20A has a high transmissivity Tt when a light intensity has a predetermined value Ic while it has a low transmissivity Tb when a light intensity departs from the predetermined value Ic. In other words, the non-linear transmission recording film 20A absorbs a portion of a low intensity light. However, a non-linear transmissive material having a usual non-linear transmission characteristic has a gradually increasing transmissivity as a light intensity becomes large as shown in FIG. 10. The non-linear transmissive material includes Cds, CdTe, CdSe and AlGaAs, etc. Otherwise, a semiconductor material and an organic high polymer synthetic material, etc. may be used as the non-linear transmissive material. When such a non-linear transmissive material is used as a recording film, the recording film has a transmissivity T1 varying in accordance with $|\{(n-n_s)/(n+n_s)\}|^2$. Herein, "$n_s$" represents a refractive index of the light transmission layers 10 and 14, and "n" does a refractive index of the recording film made from a non-linear transmissive material. A refractive index n of the non-linear transmission recording film is determined by the third-order susceptibility $\chi^{(3)}$ in the same manner as the above formulas (1) and (2). In other words, a transmission characteristic of the non-linear transmission recording film is controlled by the third-order susceptibility $\chi^{(3)}$. The third-order susceptibility $\chi^{(3)}$ is varied by doping the non-linear transmissive material forming the recording film with an impurity. As a result, the non-linear transmission recording film 20A is formed of the doped non-linear transmissive material to have a light transmission characteristic as shown in FIG. 9. On the other hand, the full-reflective recording film 20B has a constant reflection coefficient Rc irrespective of a light intensity I as shown in FIG. 11. The second recording layer 20 formed of such a dual recording film allows the recording capacity of an optical recording medium to be increased by reducing a recording pit (or recording mark) expressing an information. This results from the size of an effective light beam being reduced by the second recording layer 20. More specifically, the intensity of light beam usually has a maximum value Imax at the center of a light spot and has a gradually lower value as it goes toward a circumference of the light spot' as shown in FIG. 5. When the second recording layer 20 is accessed, the incident light beam ILB irradiated onto the full-reflective recording film 20B by way of the first recording layer 12, the light transmission layer 14 and the non-linear transmissive recording layer 20A is irradiated in a shape of spot having an effective diameter of "D". In this case, the non-linear transmissive recording film 20A transmits only lights having an intensity more than a constant value Ic in the incident lights toward the full-reflective recording film 20B while it absorbs lights having an intensity less than the constant value Ic. In other words, the non-linear transmissive recording film 20A passes only lights having an intensity more than the constant value Ic positioned at the center of a light spot as shown in FIG. 12. Also, the full-reflective recording film 20B reflects all the lights passing through the non-linear transmissive recording film 20A. The, reflective light beam reflected by the full-reflective recording film 20B is incident to a photo detector (not shown) via the non-linear recording film 20A, the second light transmission layer 14, the first recording layer 12 and the first light transmission layer 10. As described above, the non-linear transmissive recording film 20A transmits a light selectively in accordance with a light intensity to thereby reduce the effective diameter of a light spot irradiated onto the full-reflective material layer 20B. Accordingly, the reflective light beam reflected by the second recording layer 20 has an effective diameter d smaller than an effective diameter D of the incident light beam as shown in FIG. 13. The second recording layer 20 is accurately accessed by reducing the effective diameter of a light beam. Furthermore, a recording pit (or a recording mark) on the second recording layer 20 is decreased and, at the same time, a recording capacity of the second recording layer 20 is increased.

An optical characteristic of the optical recording medium of FIG. 8 will be described below. When the first recording layer 12 is accessed, a light beam irradiated onto the first recording layer 12 becomes relatively strong because a light spot is formed on the first recording layer 12. In this case, if the intensity of a light irradiated onto the first recording layer 12 is "1$b$", then a reflection coefficient R1 of the first recording layer 12 becomes 0.4 as shown in FIG. 4. Accordingly, when the first recording layer 12 is accessed, a light amount reflected by the optical recording medium becomes 40% of the incident light amount. Otherwise, when the second recording layer 20 is accessed, a light irradiated onto the first recording layer 12 has a relatively low intensity value because a light spot is formed on the second recording layer 20. In this case, if the intensity of a light irradiated onto the first recording layer 12 is "1$a$", then the first recording layer 12 reflects 30% of the incident light while transmitting 70% thereof toward the second recording layer 20 as shown in FIG. 4. A light beam transmitting the first recording layer 12 is reflected by the second recording layer 20 and thereafter is again weakened when it passes the first recording layer 12. Herein, a reflection coefficient R2 of the second recording layer 20 is 0.7, then a reflection coefficient of the optical recording medium when the second recording layer 20 is accessed becomes "0.343=(1−R1)×R2×(1−R1)=0.7× 0.7×0.7". Accordingly, when the second recording layer 20 is accessed, the optical recording medium reflects 34.3% of the incident light amount. As described above, a reflection coefficient of the first recording layer 12 made from a material with a non-linear reflection characteristic increases non-linearly in accordance with the intensity of a light beam, so that an optical recording medium according to an embodiment of the present invention has a high light reflection coefficient even when the second recording layer 20 is accessed. Accordingly, an optical recording medium according to an embodiment of the present invention permits an information recorded on a recording layer away from a light source to be accurately reproduced.

Figure 14A:
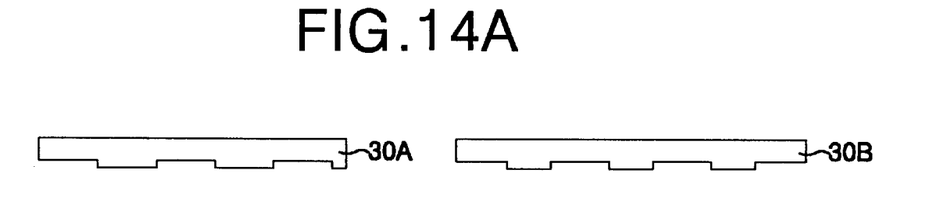
FIG. 14A to FIG. 14C are sectional views for explaining a method of fabricating an optical recording medium with two recording layers according to an embodiment of the present invention step by step.
Figure 14B:
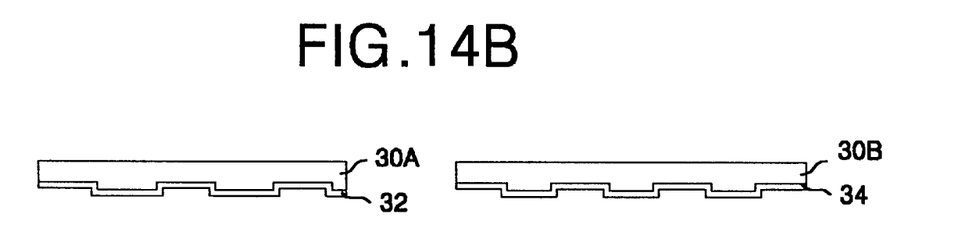
Figure 14C:
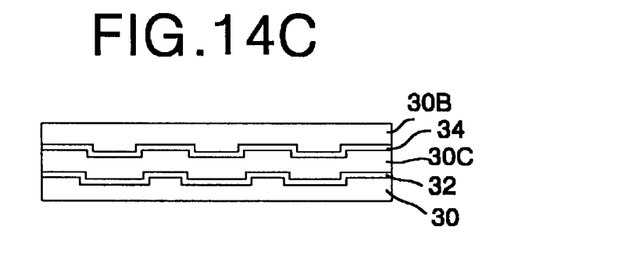

FIG. 14A to FIG. 14C are sectional views for explaining a method of fabricating an optical recording medium with two recording layers according to an embodiment of the present invention step by step. Referring to FIG. 14A, first and second substrates 30A and 30B made from a glass or a polycarbonate are provided. A melted substrate material, for example, a glass or a polycarbonate, etc. is injected into a mold installed with a disc stamper provided with a recording pit (or a recording mark) expressing a guide groove and/or a binary information and thereafter cooled to be molded. Accordingly, the first and second substrates 30A and 30B are used as light transmission layers. Also, each of the substrates 30A and 30B is provided with recording pits (or recording marks) expressing guide grooves and/or binary information. Next, a non-linear reflective recording film 32 is formed as shown in FIG. 14B on the first substrate 30A provided with guide grooves and/or recording pits. The non-linear reflective recording film 32 is grown by depositing any one of a material with a non-linear reflection characteristic as shown in FIG. 4, for example, a-Si, InSb, ZnTe, ZnSe, CdSSe, GaAs and GaSb, etc. using a vapor deposition method such as deposition or sputtering. At the same time, a full-reflective recording film 34 is grown as shown in FIG. 14B by depositing a metal material such as aluminum, etc. on the second substrate 30B provided with guide grooves and/or recording pits using a vapor deposition method. The second substrate 30B provided with the full-reflective recording film 34 is bonded to the first substrate 30 in such a manner that the full-reflective recording film 34 is spaced from the non-linear reflective recording film 32 as shown in FIG. 14C. As for a bonding process of the first and second substrates 30A and 30B, a liquid state of transparent resin film 30C with an optical characteristic identical to the substrate material is formed on the non-linear reflective recording film 32, and then the second substrate 30B is disposed on the transparent resin film 30C. Subsequently, the liquid state of transparent resin film 30C coagulates into a solid state by irradiating an ultraviolet(UV) to thereby bond the first and second substrates 30A and 30B.

In FIG. 14B, a non-linear reflective recording film 34 may be disposed on the second substrate 30B instead of the full-reflective recording film 34. Also, the first a semi-transmissive recording layer made from a non-transmission material may be formed between the first substrate 30A and the non-linear reflective recording film 32. That is, a recording layer having a dual film structure including the semi-transmissive recording film and the non-linear reflective recording film may be formed on the first substrate 30A. Furthermore, a multi-layer optical medium with more than three recording layers may be fabricated by providing a number of first substrates 30A in which the non-linear reflective recording film 32 is formed each and by sequentially bonding the number of first substrates 30A and the second substrates 30B.

Figure 15A:
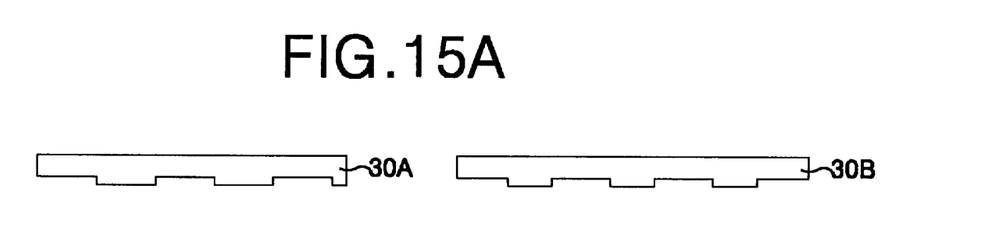
FIG. 15A to FIG. 15D are sectional views for explaining a method of fabricating an optical recording medium with two recording layers according to another embodiment of the present invention step by step.
Figure 15B:
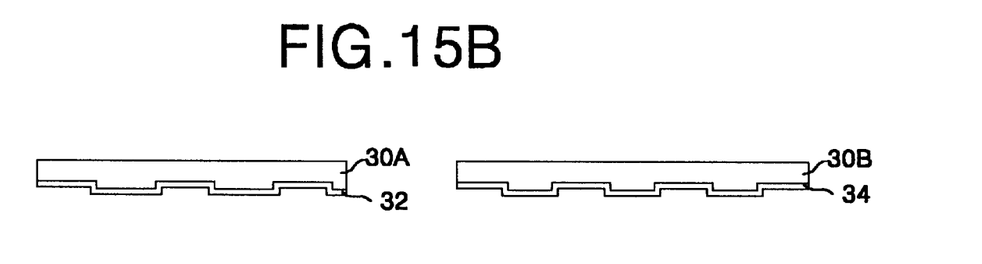
Figure 15C:
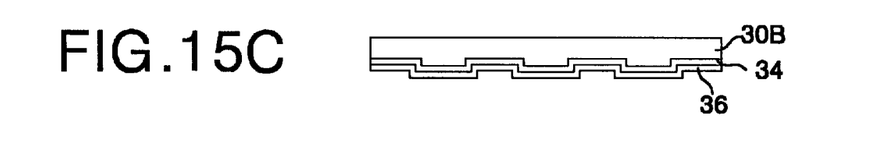
Figure 15D:
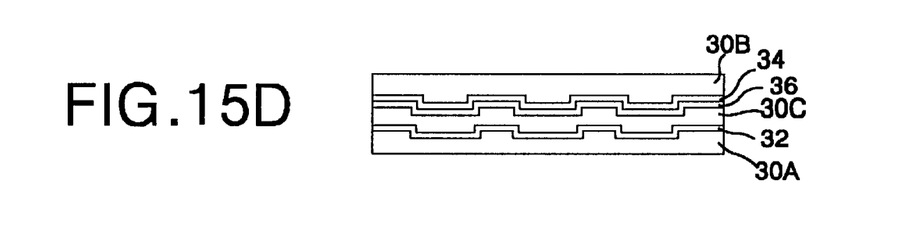

FIG. 15A to FIG. 15D are sectional views for explaining a method of fabricating an optical recording medium with two recording layers according to an embodiment of the present invention step by step. Referring to FIG. 15A, first and second substrates 30A and 30B having recording pits (or recording marks) expressing guide grooves and/or binary information are provided. A non-linear reflective recording film 32 having a non-linear reflection characteristic in FIG. 4 is formed as shown in FIG. 15B on the first substrate 30A provided with guide grooves and/or recording pits. At the same time, the full-reflective recording film 34 made from a full-reflective material as shown in FIG. 15B on the second substrate 30B provided with guide grooves and/or recording pits. The non-linear transmissive recording film 36 made from a non-linear material having the non-linear transmission characteristic in FIG. 9 is formed as shown in FIG. 15C on the full-reflective recording film 34. The non-linear transmissive recording film 36 is grown by depositing any one of Cds, CdTe, CdSe, AlGaAs, a semiconductor material and an organic high polymer synthetic, etc. on the full-reflective recording film 34 using the vapor deposition method. The full-reflective recording film 34 and the non-linear transmissive recording film 36 is used as a single recording layer with a double film structure. The full-reflective recording film 34 and the non-linear transmissive recording film 36 allows an effective diameter of a light spot to be reduced, thereby enlarging a recording capacity. The second substrate 30B provided with the full-reflective recording film 34 and the non-linear transmissive recording film 36 is bonded to the first substrate 30A in such a manner that the non-liner transmissive recording film 36 is spaced from the non-linear reflective recording film 32 as shown in FIG. 15D. As for a bonding process of the first and second substrates 30A and 30B, a liquid state of transparent resin film 30C with an optical characteristic identical to the substrate material is formed on the non-linear reflective recording film 32, and then the second substrate 30B is disposed on the transparent resin film 30C. Subsequently, the liquid state of transparent resin film 30C coagulates into a solid state by irradiating an ultraviolet(UV) to thereby bond the first and second substrates 30A and 30B.

In FIG. 15C, a non-linear reflective recording film 32 having the non-linear reflection characteristic as shown in FIG. 4 may be formed instead of the non-linear transmissive recording film 36.

As described above, in the optical recording medium with a number of recording layers according to the present invention, recording layers close to the light source has a reflective coefficient varying a light intensity. Accordingly, a light amount reflected by recording layers away from the light source is increased. As a result, the recording layers away from the light source can be accessed accurately. As the light efficiency rises as mentioned above, the optical recording medium according to the present invention can increase the recording layer into more than two. Also, in the optical recording medium with a number of recording layers according to the present invention, an effective diameter of a light spot is reduced to thereby reduce a recording pit. Accordingly, the optical recording medium according to the present invention has a large recording capacity. Furthermore, in the optical recording medium, the recording layer farthest away from the light source has a dual recording film consisting of the full-reflective recording film and the non-linear material film to thereby reduce an effective diameter of a light spot. As a result, the optical recording medium according to the present invention has a large recording capacity.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An optical recording medium having a plurality of recording layers wherein said layers with the exception of a recording layer farthest from a light source in said plurality of recording layers is made from a non-linear material having a reflective coefficient which varies in accordance with a light intensity.

2. The optical recording medium as claimed in claim 1, wherein the reflective coefficient of the non-linear material becomes higher as the light intensity becomes stronger.

3. The optical recording medium as claimed in claim 1, wherein a recording layer made from a semi-transmissive material is formed on each of the recording layers made from the non-linear material.

4. An optical recording medium having a plurality of recording layers wherein the recording layer farthest from a light source in said plurality of recording layers is made from a non-linear material having a transmissivity which varies in accordance with light intensity.

5. The optical recording medium as claimed in claim 4, wherein the transmissivity of the non-linear material becomes lower as the light intensity becomes stronger.

6. The optical recording medium as claimed in claim 4, wherein the remaining recording layers with the exception of the recording layer farthest away from the light source in the plurality of recording layers are made from either a non-linear material or a semi-transmissive material.

7. The optical recording medium as claimed in claim 6, wherein a recording layer made from a semi-transmissive material is further formed on the recording layer made from said non-linear material.

8. A method of fabricating an optical recording medium having a plurality of recording layers, comprising the steps of:

provinding a plurality of substrates;

forming a recording layer on each of the plurality of substrates in such manner that a material with an non-linear optical characteristic having a reflective coefficient which varies in accordance with light intensity is formed on one of the plurality of substrates; and bonding the same in such a manner that the material with the non-linear optical characteristic is positioned farthest away from a light source.

* * * * *